United States Patent
Muñiz Casais et al.

(10) Patent No.: US 9,973,045 B2
(45) Date of Patent: May 15, 2018

(54) GENERATOR ROTOR, ASSEMBLY METHOD AND RELATED INSERTION TOOL

(75) Inventors: César Muñiz Casais, Taradell (ES); Santiago Claramunt Estecha, Barcelona (ES)

(73) Assignee: GE Renewable Technologies Wind B.V., Breda (NL)

( * ) Notice: Subject to any disclaimer, the term of this patent is extended or adjusted under 35 U.S.C. 154(b) by 821 days.

(21) Appl. No.: 14/115,336

(22) PCT Filed: May 10, 2012

(86) PCT No.: PCT/EP2012/058670
§ 371 (c)(1),
(2), (4) Date: Nov. 1, 2013

(87) PCT Pub. No.: WO2012/152878
PCT Pub. Date: Nov. 15, 2012

(65) Prior Publication Data
US 2014/0084593 A1    Mar. 27, 2014

Related U.S. Application Data

(60) Provisional application No. 61/540,844, filed on Sep. 29, 2011.

(30) Foreign Application Priority Data

May 11, 2011 (EP) .................................... 11382142

(51) Int. Cl.
*H02K 1/27* (2006.01)
*H02K 15/03* (2006.01)
(Continued)

(52) U.S. Cl.
CPC ................ *H02K 1/27* (2013.01); *F03D 9/25* (2016.05); *H02K 1/278* (2013.01); *H02K 7/1838* (2013.01);
(Continued)

(58) Field of Classification Search
CPC .......... H02K 1/27; H02K 1/278; H02K 15/03; H02K 2213/12; F02D 9/002; Y02E 10/725; Y10T 29/49012; Y10T 29/53143
(Continued)

(56) References Cited

U.S. PATENT DOCUMENTS 2,516,901 A * 8/1950 Morrill .................. H02K 1/278
310/156.18
5,684,352 A    11/1997 Mita et al.
(Continued)

FOREIGN PATENT DOCUMENTS

CN        102025236 A       4/2011
DE     10 2005033561       1/2007
(Continued)

OTHER PUBLICATIONS

Chinese Patent Office Action, dated May 12, 2016.
(Continued)

*Primary Examiner* — John K Kim
(74) *Attorney, Agent, or Firm* — Dority & Manning, P.A.

(57) ABSTRACT

Generator rotor comprising a rotor rim and a plurality of permanent magnet modules and a plurality of anchors arranged at an outer or inner circumference of the rotor rim such that the anchors substantially fix the permanent magnet modules to the rotor, wherein the permanent magnet modules comprise a base having a bottom surface, two axially extending side surfaces and a top surface, and one or more rows of magnets mounted on said top surface, wherein the two side surfaces of the permanent magnet modules each comprise an axially extending groove, and wherein the anchors have a shape that substantially fits exactly in axially extending grooves of neighboring permanent magnet modules.

12 Claims, 7 Drawing Sheets

(51) Int. Cl.
*H02K 7/18* (2006.01)
*F03D 9/25* (2016.01)

(52) U.S. Cl.
CPC ......... *H02K 15/03* (2013.01); *H02K 2213/12* (2013.01); *Y02E 10/725* (2013.01); *Y10T 29/49012* (2015.01); *Y10T 29/53143* (2015.01)

(58) Field of Classification Search
USPC ............ 310/156.12, 156.18, 156.21, 156.23, 310/156.53, 156.72; 290/44, 55; 29/598, 29/732
IPC ........................... H02K 1/27,15/03; F03D 9/00
See application file for complete search history.

(56) References Cited

U.S. PATENT DOCUMENTS

| | | | |
|---|---|---|---|
| 5,914,552 A * | 6/1999 | Hsu | H02K 1/278 310/156.18 |
| 6,081,052 A * | 6/2000 | Hosoe | B23K 1/19 310/12.23 |
| 6,481,090 B1 | 11/2002 | Franco et al. | |
| 7,808,149 B2 | 10/2010 | Pabst et al. | |
| 7,936,102 B2 * | 5/2011 | Pabst | H02K 1/2773 29/598 |
| 8,598,760 B2 * | 12/2013 | Kurronen | H02K 1/276 29/598 |
| 2002/0163270 A1 * | 11/2002 | Almada | H02K 5/15 310/90 |
| 2004/0150283 A1 | 8/2004 | Calfo et al. | |
| 2005/0028890 A1 * | 2/2005 | Sakaki | H01F 1/0557 148/105 |
| 2006/0028083 A1 * | 2/2006 | Costin | H02K 1/2773 310/156.55 |
| 2007/0290564 A1 * | 12/2007 | Clark | H02K 1/278 310/156.29 |
| 2009/0167103 A1 * | 7/2009 | Jansen | H02K 1/278 310/156.48 |
| 2010/0194226 A1 | 8/2010 | Metzner et al. | |
| 2011/0043065 A1 | 2/2011 | Piercey et al. | |
| 2011/0140561 A1 * | 6/2011 | Clark | H02K 1/278 310/156.12 |
| 2011/0204739 A1 * | 8/2011 | Rebollo Gomez | H02K 1/278 310/156.12 |
| 2011/0285216 A1 * | 11/2011 | Kurronen | H02K 1/276 310/45 |
| 2014/0084593 A1 * | 3/2014 | Muniz Casais | H02K 1/278 290/55 |

FOREIGN PATENT DOCUMENTS

| | | |
|---|---|---|
| DE | 102005033561 | 1/2007 |
| DE | 10 2005042543 | 3/2007 |
| EP | 1 777 795 | 4/2007 |
| EP | 1860755 | 11/2007 |
| EP | 2063117 | 5/2009 |
| EP | 2282397 | 2/2011 |
| EP | 2 348612 | 7/2011 |
| JP | 57-059462 | 4/1982 |
| JP | H10336929 | 12/1998 |
| WO | WO 02/103882 | 12/2002 |
| WO | WO 2007/063369 | 6/2007 |
| WO | WO 2007/063370 | 6/2007 |

OTHER PUBLICATIONS

International Search Report and Written Opinion for PCT/EP2012/058670, dated Jun. 25, 2012, 14 pgs.
Opposition against European Patent No. EP 2,523,316, on Jun. 3, 2015, 31 pgs.

* cited by examiner

GENERATOR ROTOR, ASSEMBLY METHOD AND RELATED INSERTION TOOL

This application claims the benefit of European Patent Application EP11382142 filed on 11 May 2011 and U.S. Provisional Patent Application Ser. No. 61/540,844 filed on 29 Sep. 2011.

The present invention relates to a generator rotor, and more particularly relates to a generator rotor that is especially suitable for a wind turbine.

BACKGROUND ART

Generators having a rotor carrying permanent magnets are known. They are generally deemed to be reliable and require less maintenance than other generator topologies.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox. For offshore wind turbines, direct drive systems employing permanent magnets are usually chosen.

Such a direct drive wind turbine generator may have e.g. a diameter of 6-8 meters and a length of e.g. 2-3 meters. Hundreds of magnets may need to be screwed or glued to the circumference of the rotor. It will be clear that this manufacturing process can be cumbersome.

Furthermore, if one or more magnets is damaged and needs to be replaced, the access to these magnets can be complicated (especially with large size generators), such that maintenance can become very expensive.

This size and type of generator however is not limited to the technical field of wind turbines only. Generators of considerable dimensions may also be found e.g. in steam turbines and water turbines.

SUMMARY OF THE INVENTION

In a first aspect, the present invention provides a generator rotor comprising a rotor rim and a plurality of permanent magnet modules and anchors arranged at an outer (or inner) circumference of the rotor rim such that the anchors substantially fix the permanent magnet modules to the rotor. The permanent magnet modules comprise a base having a bottom surface, two axially extending side surfaces and a top surface. One or more rows of magnets are mounted on said top surface, and the two side surfaces of the permanent magnet modules each comprise an axially extending groove. The anchors have a shape that substantially fits exactly in axially extending grooves of neighbouring permanent magnet modules to substantially fix the permanent magnet modules to the rotor In this aspect of the invention, a permanent magnet generator rotor is provided for which the assembly and maintenance is facilitated. Both for repair and manufacture, modules of magnets can be relatively easily inserted in place and removed.

In some embodiments, each permanent magnet module comprises a single row of magnets. In other embodiments, each permanent magnet module comprises at least two rows of magnets.

In some embodiments, the anchors may be substantially T-shaped with a corresponding groove in the permanent magnet modules. T-shaped anchors and square grooves may rather easily be manufactured/machined.

In order to securely fasten the magnets to the generator rotor, the permanent magnet modules may comprise one or more belts that are attached to the front and rear of the base element for binding the permanent magnets to the base. Also, the permanent magnets may be covered with a non-magnetic material, such as a resin or stainless steel. A cover may serve to protect the magnets against corrosion, whereas a cover may induce parasitic currents and/or decrease thermal dissipation.

In some embodiments, the permanent magnet modules may have a length substantially corresponding to half of the length of the generator. Two permanent magnet modules may be inserted behind each other. In these embodiments, one of the modules may be easily extracted (and introduced) from the front of the rotor, and the other module may be easily extracted (and introduced) from the rear, for example during maintenance.

In another aspect, the invention provides an insertion tool for use in the assembly of a generator rotor substantially as hereinbefore described. The insertion tool may comprise a substantially curved plate with a plurality of guiding elements, the curvature of the plate corresponding to the curvature of the rotor rim and the shape of the guiding elements substantially corresponding to the shape of the anchors, two neighbouring guiding elements defining an insertion track between them.

With an insertion tool according to this aspect, the insertion (and extraction) of permanent magnet modules may be facilitated. When inserting permanent magnet modules, the module may be attracted to or repelled by other already mounted modules. The insertion tool may ensure the proper alignment and positioning of the permanent magnet module.

In yet a further aspect, the invention provides a method of assembling a generator rotor substantially as hereinbefore described, comprising loosely attaching two or more anchors to the rotor rim, inserting a permanent magnet module between two of said anchors, and tightly attaching the anchors to the rotor rim. An advantageous method for assembly of the generator rotor is thus provided. In some embodiments, an insertion tool substantially as hereinbefore described may be used.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1A:
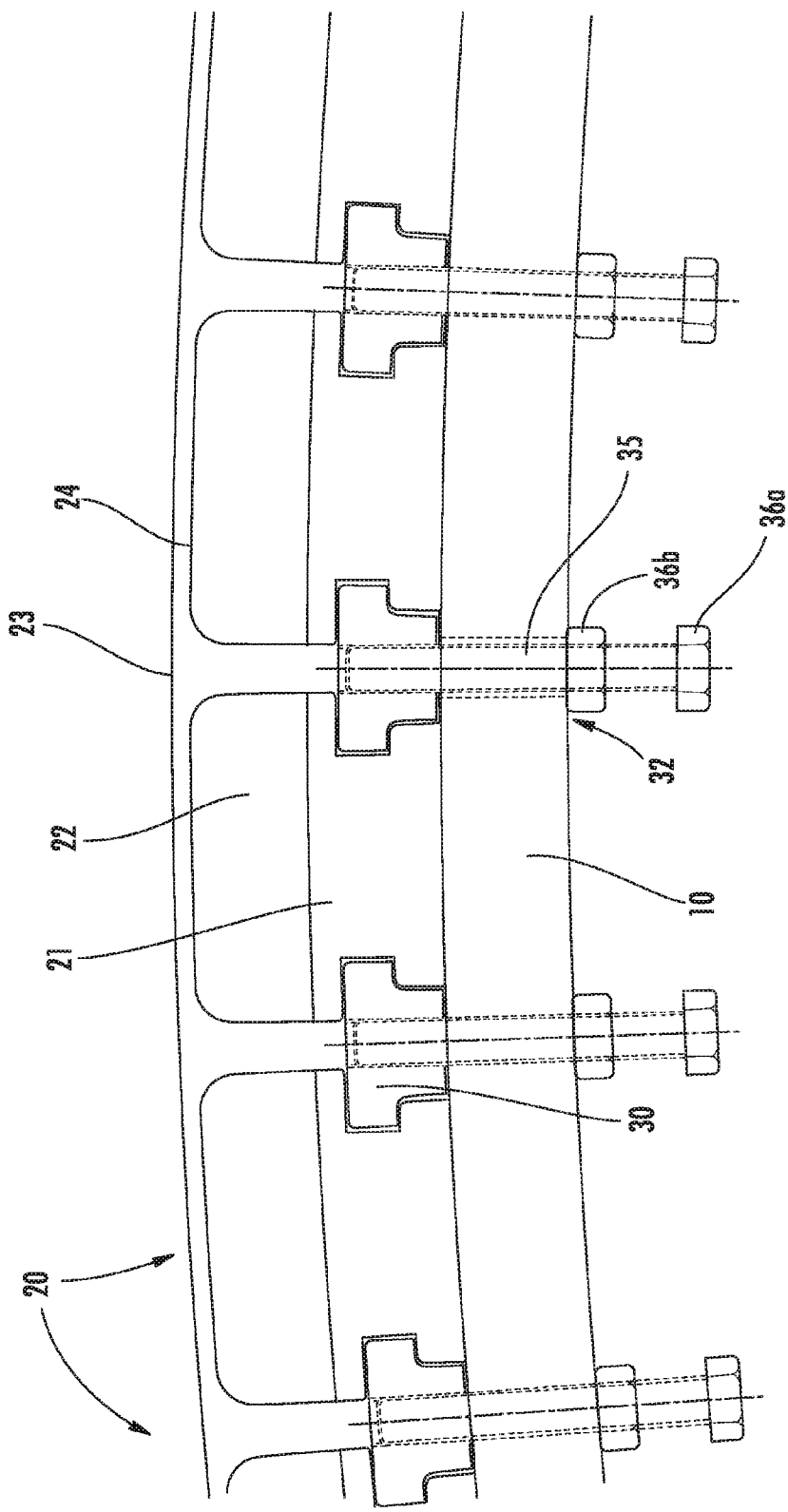
FIGS. 1a and 1b illustrate cross-sectional views of a generator rotor in accordance with embodiments of the present invention.

FIG. 1a illustrates a cross-sectional view of a circle sector of a generator rotor according to an embodiment of the present invention. The generator rotor comprises a rotor rim 10 upon which a plurality of permanent magnet modules 20 is arranged. The permanent magnet modules (and the generator rotor itself) extend in an axial direction from the front to the rear of the generator rotor.

In this example, the generator comprises a generator stator arranged externally to the generator rotor. The permanent magnet modules are thus arranged on an outer circumference of the rotor rim.

Each of the permanent magnet modules comprises a base 21 that carries a plurality of magnets 22. In this example, a single row of magnets 22 extending in an axial direction is provided. The side surfaces of the bases 21 comprise a groove in which anchors 30 fit. The base 21 may e.g. be made from steel or another magnetically conducting material and may be made e.g. from one integral piece or from a plurality of slices/sheets clamped together.

To assemble the generator rotor, the anchors may be loosely attached at the circumference of the rotor rim using e.g. bolts 35 with head 36. Then, the permanent magnet modules 20 may be inserted and slid between two neighbouring anchors. Then, to fix the magnet modules in place, the bolts 35 may be tightened (moving from position 36a to 36b), so that the anchors fix a portion of the base 21 to the outer circumference of the rotor rim. The inner side of the rotor rim may comprise a flattened portion 32 for better tightening of the bolt 35.

In this aspect, a permanent magnet generator rotor is provided for which the assembly and maintenance is facilitated. Both for repair and manufacture, modules of magnets can be relatively easily inserted and removed.

The permanent magnets 20 may be covered with a thin plate of stainless steel and/or by e.g. an epoxy resin 23. In alternative embodiments, the permanent magnets may not be covered at all. These embodiments may provide good cooling of the magnets, using the free space between them. With a cover, the permanent magnets may be more protected from their environment and it may e.g. reduce the likelihood and degree of corrosion. However, a cover may decrease thermal dissipation and may also cause parasitic currents in the cover. For this reason, generally non-magnetic materials may be used.

Figure 1B:
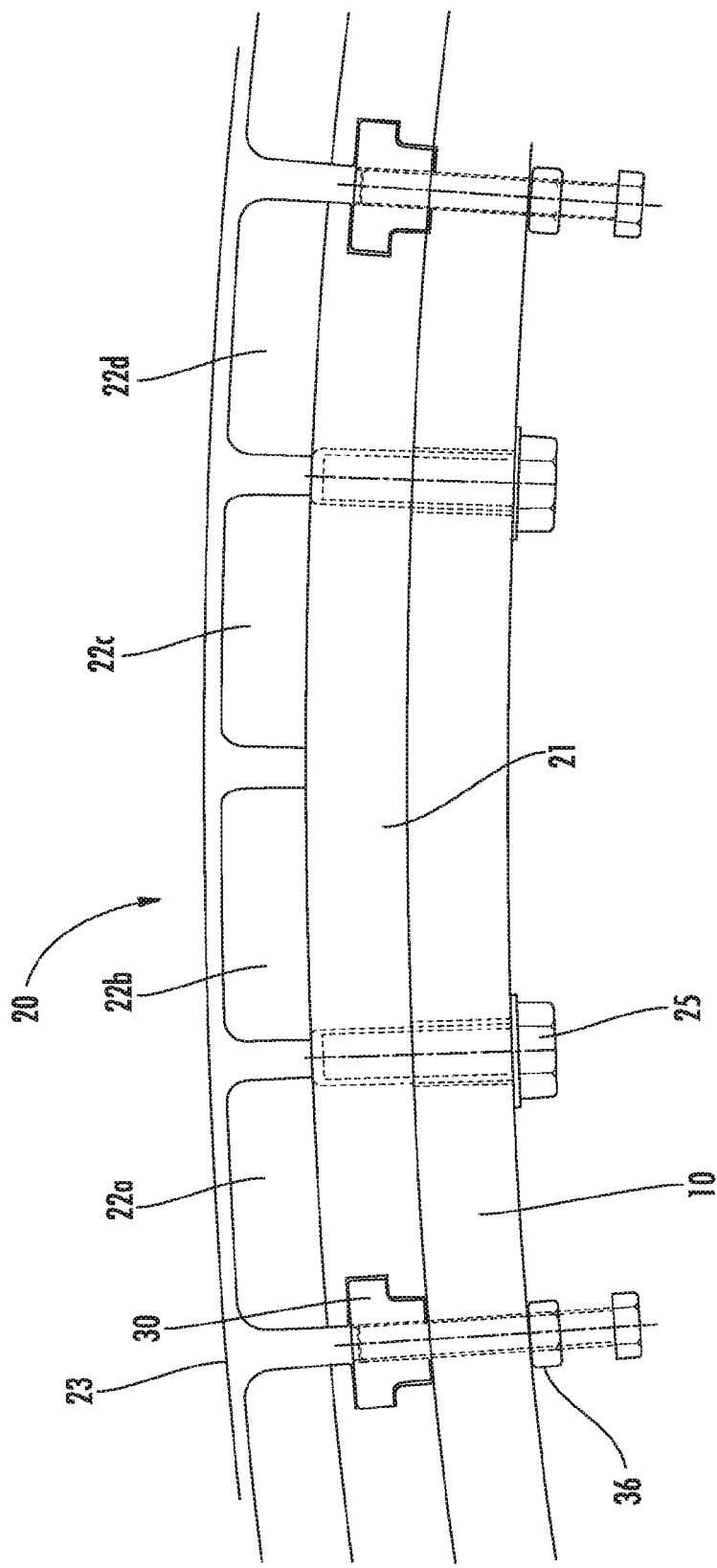

In the example of FIG. 1a, each permanent magnet module carries a single row of permanent magnets. The example of FIG. 1b is different in this respect: each module 20 comprises a base 21, but on the top surface of the base, four rows 22a, 22b, 22c and 22d of permanent magnets are provided. The width of the permanent magnet modules and the number of rows of magnets may be varied. Having a higher number of magnets per module reduces the number of modules and may simplify the assembly procedure. On the other hand, smaller modules may be more easily manufactured.

The shape of the magnets with bevelled edges is relatively easily manufactured and is able to induce a substantially sinusoidal voltage and provide a reduced cogging torque.

In the example of FIG. 1b, apart from the anchors 30 that fit in the grooves of the permanent magnet modules, a number of additional bolts 25 may be provided along the width and length of the module to more securely fix the base in place with respect to the rotor rim.

Not shown in FIGS. 1a and 1b is the central rotor structure, supporting the rotor rim 10. Such a rotor structure may take many suitable forms and may comprise e.g. a hub with a plurality of radially extending spokes supporting the rotor rim, or a more solid rotor.

Figure 1C:
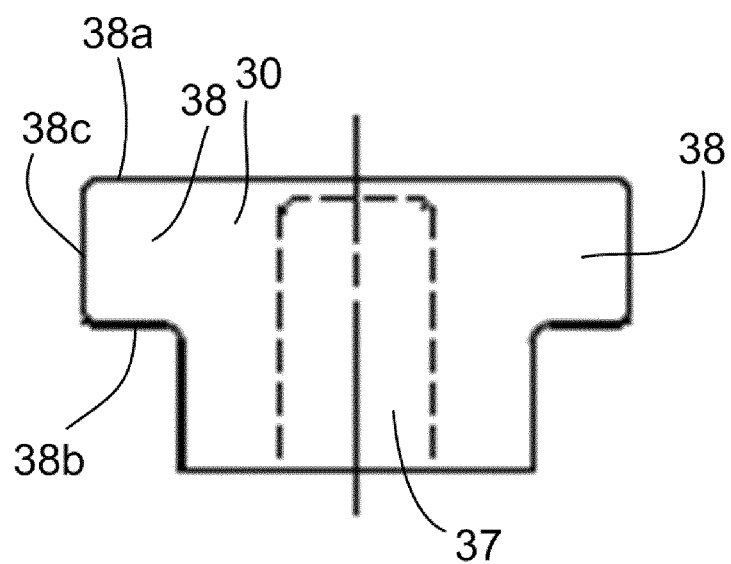
FIG. 1c illustrates an anchor that may be used in embodiments of the invention.

FIG. 1c more clearly illustrates the anchors 30 employed in the examples of FIGS. 1a and 1b. Anchor 30 may be substantially T-shaped having two sideways extending anchoring portions 38 which fit in a corresponding groove of the permanent magnet modules. Anchoring portion 38 comprises a contact surface 38b that in use is in contact with a contact surface of a base of a module. Anchoring portion 38 furthermore comprises horizontal fitting surface 38a and vertical fitting surface 38c which assist in guiding and positioning the permanent magnet modules with respect to the anchors.

The anchor 30 furthermore comprises one or more central bores 37 along its length. The central bores 37 serves to accommodate a bolt 35 which fixes the anchor to the rotor rim. When the bolts are tightened, the contact surface 38b pushes down on corresponding contact surface 26a of the permanent magnet module (see FIG. 2a).

Since the permanent magnet module is fixed to the rotor rim through its base, friction between fasteners and permanent magnets can substantially be avoided in embodiments of the invention, both in operation and during assembly.

In an alternative embodiment, a generator may have a configuration in which a generator rotor is arranged outside (surrounding) the generator stator. In this case, the permanent magnet modules and anchors may be arranged on an inner circumference of the rotor rim. Bolts used for fixing the anchors to the rotor rim may thus extend radially inwardly from the outside of the rotor.

Figure 2A:
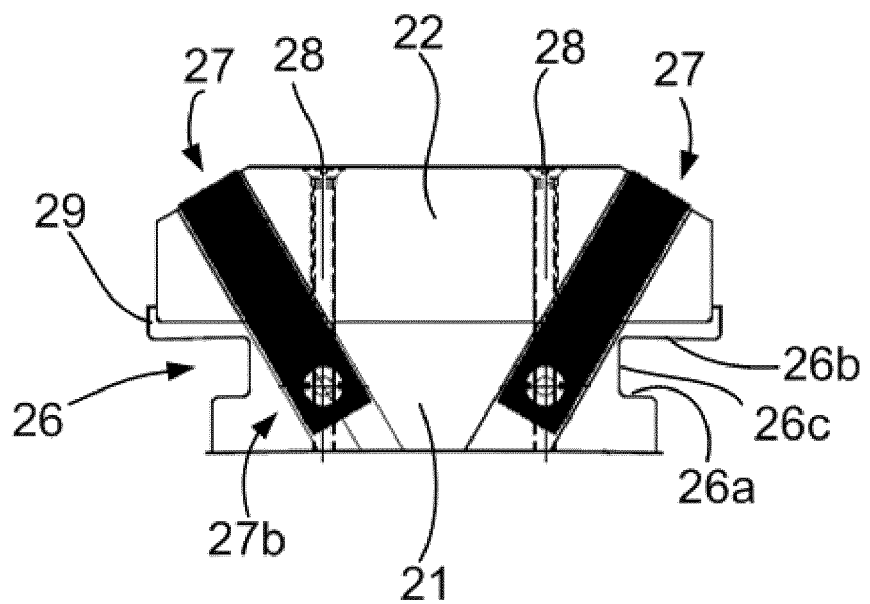
FIGS. 2a and 2b illustrate a front view and side view of a permanent magnet module in accordance with an embodiment of the present invention.
Figure 2B:
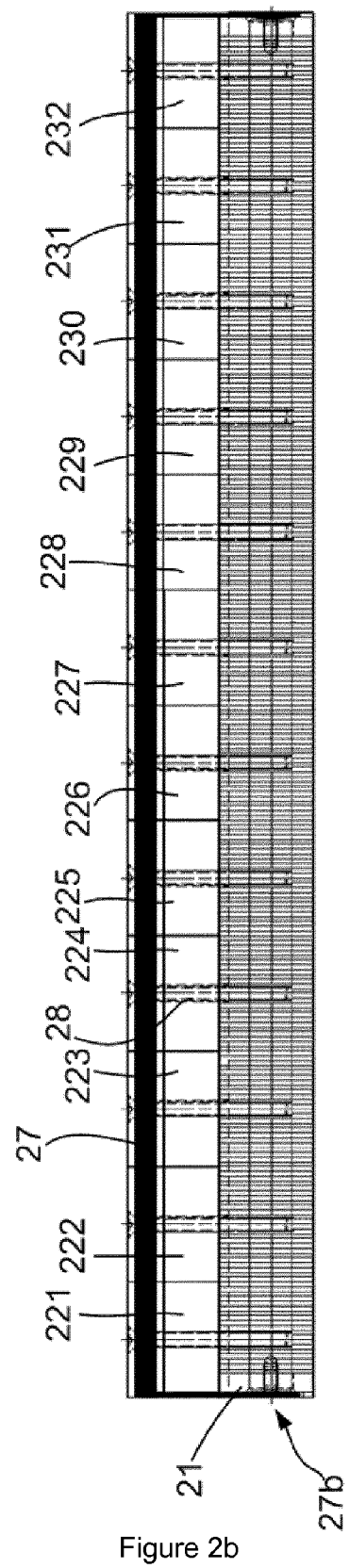

FIGS. 2a and 2b illustrate a front view and side view of a permanent magnet module in accordance with an embodiment of the present invention. The permanent magnet modules comprise a base 21 and a row of permanent magnets 22. In this embodiment, the permanent magnets 22 may be mounted on the base 21 using sets of screws 28. Additionally, the magnets may be glued to the base. Furthermore, belts 27 are attached at a front of the module, extend on top of the permanent magnets towards the rear and are attached at a rear of the module (see also FIG. 2b) to thereby bind the permanent magnets to the base. In alternative embodiments, only one or two of these ways to fix the magnet on the base may be used: in a specific example, the magnets may be glued to the base and the belts are merely provided for if and when the glue degrades during the lifetime of the generator. In another example, the magnets may be glued to the base without any additional fastening mechanism. Friction between magnets and fasteners may thus be avoided.

To more easily and precisely position a magnet on top of the base, the top surface of the base may comprise two upstanding guides 29 between which magnets can be placed.

FIG. 2b illustrates a row of magnets 221-232 as seen in an axial cross-section. Belts 27 may be fixed with a pin (or other fastener) 27b at the front and at the rear of the permanent magnet module.

Figure 3A:
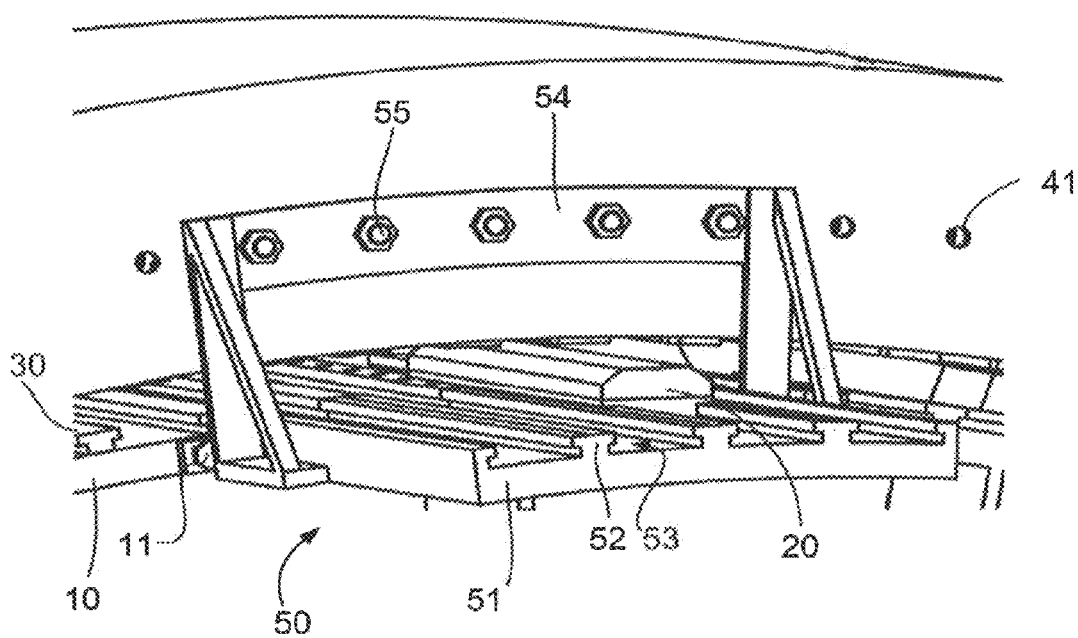
FIGS. 3a-3b schematically illustrate methods for assembly of a generator rotor in accordance with embodiments of the present invention.
Figure 3B:
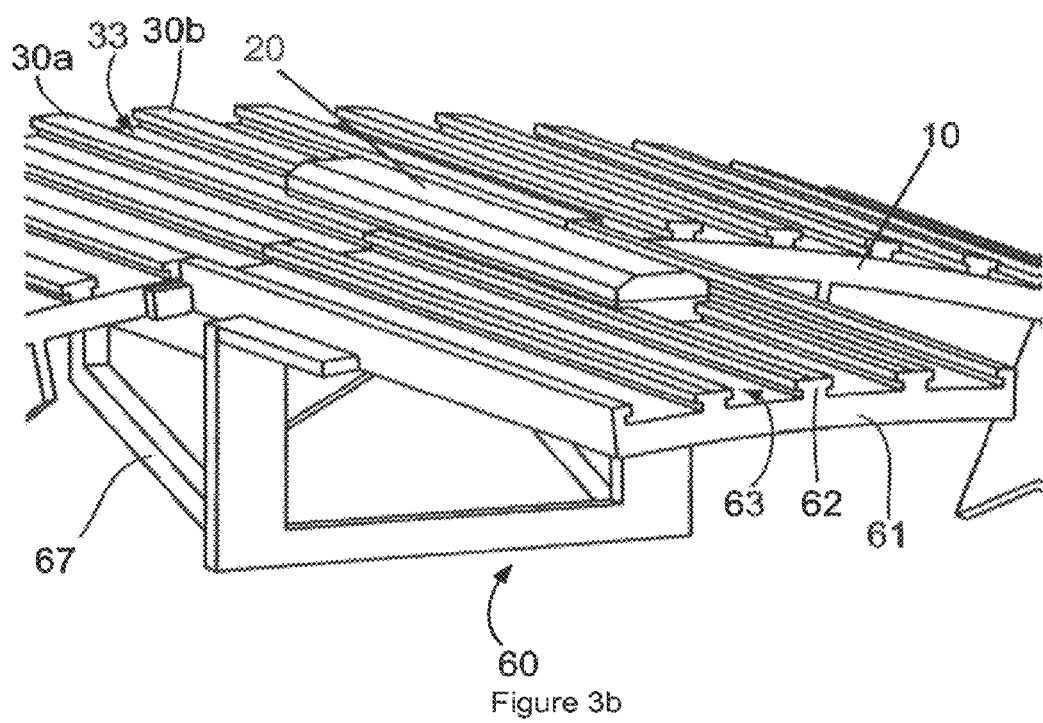

FIGS. 3a and 3b schematically illustrate methods for assembly of a generator rotor in accordance with embodiments of the present invention. In the method schematically illustrated in FIG. 3a, the permanent magnet modules are positioned and fixed to the rotor rim when the generator stator is already arranged around the generator rotor.

An insertion tool 50 having a curved plate 51 with a plurality of axially extending guiding elements 52 is provided. The shape of the guiding elements 52 may substantially correspond to the shape of the anchors 30 already attached at the rotor rim. In this specific example, the guiding elements are substantially T-shaped. Insertion tracks 53 are defined between two neighbouring guiding elements 52.

The curvature of the plate 51 substantially corresponds to the curvature of the rotor rim. The insertion tool further has an attachment bracket 54 with mounting holes. The attachment bracket is used for mounting the insertion tool to the generator stator using bolts 55. To this end the mounting holes are to be positioned with respect to holes 41 on the generator stator.

The insertion tool may also be attached at the rotor rim 10 using bolts 11. The insertion tool is thus securely positioned with respect to the generator parts. It is ensured that the guiding elements 52 are substantially aligned with the anchors 30. Permanent magnet modules 20 may then be introduced in insertion track 53 and may be slid along the insertion tool. This way, the permanent magnet module 20 will be inserted in a track between two anchors. The fitting surfaces and contact surfaces of the anchors and the grooves ensure proper relative positioning.

In some embodiments, a hydraulic actuator (not shown) may be used for moving the permanent magnet modules along the insertion track and in between anchors 30. Once a permanent magnet module is in place, the anchors may be tightly fitted to the rotor rim, thereby locking the modules in place.

In some embodiments, the guiding elements may be slightly enlarged with respect to the anchors 30. The anchors 30 are only securely fixed in their positions by tightening of the bolts (illustrated before), once the permanent magnet modules are positioned. To better ensure proper positioning of the modules during assembly, the slightly narrower insertion tracks 53 of the insertion tool can be helpful.

The permanent magnet modules may have a length that substantially corresponds to the axial length of the generator; each permanent magnet module thus spans substantially the entire length of the generator. In other embodiments, the length of a module may be substantially half of the axial length of the generator; two permanent magnet modules span the length of the generator. In these cases, one module may be inserted from the front and one module may be inserted from the rear. Similarly, in some embodiments, the anchors may span the length of the generator. In other embodiments, the anchors are divided in various segments that together span the length of the generator.

In FIG. 3b, a generally similar assembly method using a slightly different insertion tool is illustrated. In this example, the permanent magnet modules are fixed to the rotor rim before positioning the stator and the rotor with respect to each other. The insertion tool 60 comprises a curved plate 61 with guiding elements 62 and insertion tracks 63 defined between them as in the previous example.

In this example, the insertion tool 60 comprises a mounting bracket 67 for its attachment to an inner portion of the rotor rim. The assembly method is further similar to the method described with reference to FIG. 3a. A track 33 defined between two anchors 30a and 30b is indicated in FIG. 3b.

In FIGS. 3a and 3b, once again a configuration wherein a generator stator is arranged outside a generator rotor is shown. It will be clear that the assembly method and insertion tool will be similar in a configuration in which the generator rotor is arranged outside the generator stator.

Figure 4A:
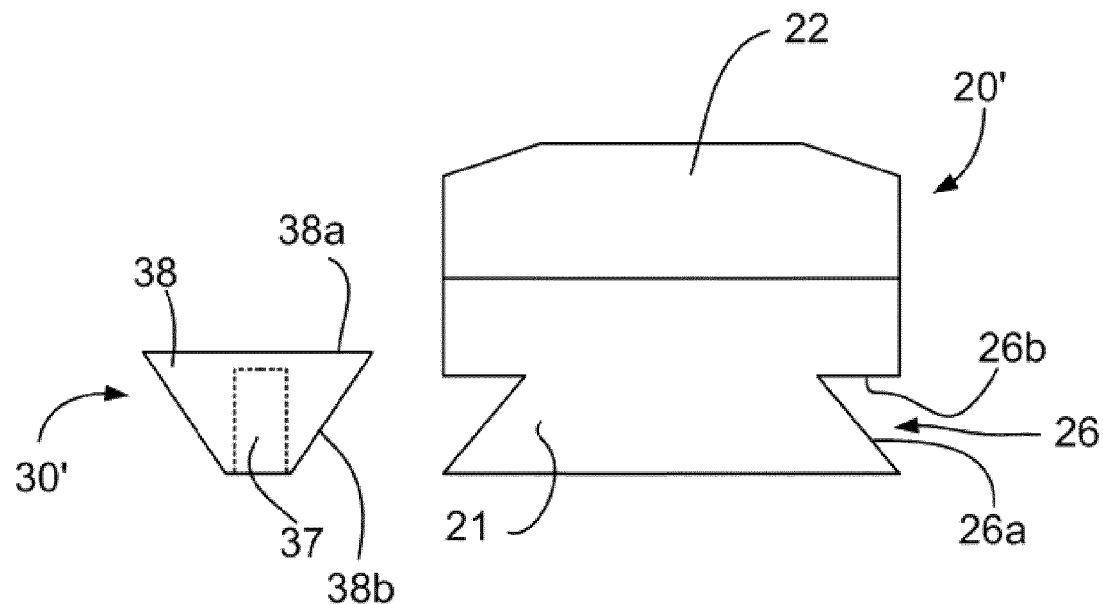
FIG. 4a illustrates a front view of an anchor and a permanent magnet module according to an embodiment of the present invention.

FIG. 4a illustrates a cross-sectional view of an anchor and a permanent magnet module according to an embodiment of the present invention. In this example, the grooves 26 in the side surfaces of the permanent magnet module 20' are substantially triangular. Similarly as in the previous example, the grooves 26 comprise a contact surface 26a, which in use comes into contact with the contact surface 38b of the anchor 30' to anchor the permanent magnet module to the rotor rim.

The anchor 30' shown in FIG. 4 has a cross-section with a substantially isosceles trapezoidal shape. It may be said that two anchoring portions 38 extend from a central portion of the anchor. The anchoring portions 38 comprise a contact surface 38b and a fitting surface 38a. The anchor furthermore comprises a hole 37 adapted to fit e.g. a bolt. In an alternative embodiment, the anchor may have a substantially triangular cross-section and fit in the same groove 26 of permanent magnet module 20'.

Figure 4B:
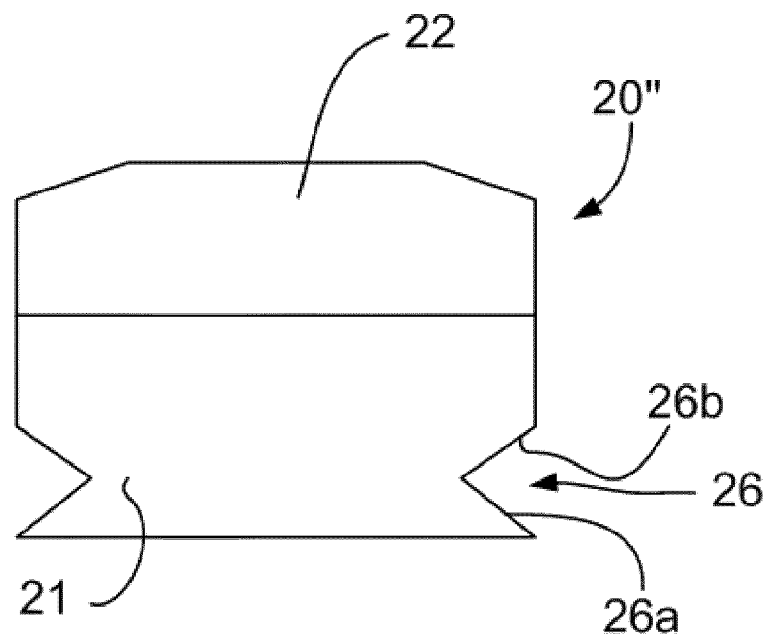
FIGS. 4b and 4c illustrate further embodiments of permanent magnet modules.
Figure 4C:
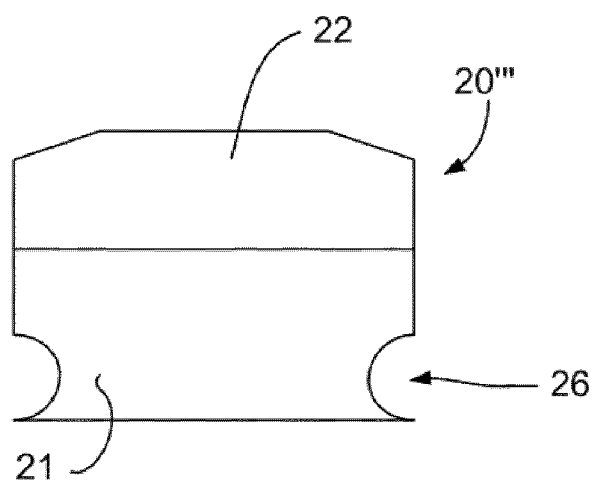

FIGS. 4b and 4c show alternative permanent magnet modules 20" and 20'", which comprise alternative shapes of the axially extending grooves in their side surfaces. Suitably shaped anchors may be used in combination with these modules to fix them in place along the outer circumference of a rotor rim. It will be clear that further alternative shapes of the grooves may be chosen without departing from the scope of the present invention.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A generator rotor, comprising:
a rotor rim, a plurality of permanent magnet modules, a plurality of attachable anchors arranged at an outer or inner circumference of the rotor rim so as to bind the permanent magnet modules to the rotor rim, and a circumferentially continuous non-magnetic cover arranged exterior to the plurality of magnet modules, the continuous non-magnetic cover comprising a plurality of protrusions, each of the plurality of protrusions extending between neighboring permanent magnet modules,
wherein the permanent magnet modules each comprise a base, one or more rows of permanent magnets, the base and the one or more rows of permanent magnets being connected as a unit with each other, the base comprising a bottom surface, a top surface, and two axially extending outer side surfaces extending between the top and bottom surfaces, the one or more rows of permanent magnets being connected to the top surface of the base,
wherein the two axially extending outer side surfaces of the each of bases of each of the permanent magnet modules comprise an axially extending groove formed into each of the axially extending outer side surfaces, wherein the anchors comprise a shape that corresponds to and fits in the axially extending grooves of adjacent permanent magnet modules.

2. The generator rotor according to claim 1, wherein each permanent magnet module comprises a single row of magnets.

3. The generator rotor according to claim 1, wherein each permanent magnet module comprises at least two rows of magnets.

4. The generator rotor according to claim 1, wherein the anchors are substantially T-shaped.

5. The generator rotor according to claim 1, wherein the permanent magnets are connected to the top surface of the base with glue.

6. The generator rotor according to claim 1, wherein the permanent magnets are connected to the top surface of the base with screws.

7. The generator rotor according to claim 1, wherein the permanent magnet modules comprise one or more belts that are attached at a front and a rear of the base element for binding the permanent magnets to the base.

8. The generator rotor according to claim 1, wherein the permanent magnets are covered with a non-magnetic material.

9. An insertion tool for use in the assembly of a generator rotor according to claim 1, comprising a substantially curved plate with a plurality of guiding elements, the curvature of the plate corresponding to a curvature of the rotor rim and the shape of the guiding elements substantially corresponding to the shape of the anchors, two neighbouring guiding elements defining an insertion track between them, and further comprising an attachment bracket for attaching the insertion tool to a generator stator.

10. The insertion tool according to claim 9, further comprising an actuator for moving a permanent magnet module along the insertion track.

11. A method assembling a generator rotor according to claim 1, comprising
loosely attaching two or more anchors to the rotor rim,
inserting a permanent magnet module between two of the anchors, and
tightly attaching the anchors to the rotor rim.

12. The method according to claim 11, wherein inserting a permanent magnet module comprises attaching an insertion tool according to claim 9 to a stator of the generator in such a way that the guiding elements of the insertion tool are aligned with the anchors of the generator rotor, and
inserting a permanent magnet module by sliding the module along the insertion track of the insertion tool.

* * * * *